United States Patent
Terneu et al.

(10) Patent No.: US 7,803,463 B2
(45) Date of Patent: *Sep. 28, 2010

(54) GLAZING PANEL HAVING SOLAR SCREENING PROPERTIES

(75) Inventors: Robert Terneu, Thimeon (BE); Philippe Legrand, Soignies (BE); Michel Hannotiau, Pietrain (BE); Alain Schutz, Gosselies (BE)

(73) Assignee: AGC Flat Glass Europe SA, Watermael-Boitsfort (BE)

( * ) Notice: Subject to any disclaimer, the term of this patent is extended or adjusted under 35 U.S.C. 154(b) by 29 days.

This patent is subject to a terminal disclaimer.

(21) Appl. No.: 11/923,823

(22) Filed: Oct. 25, 2007

(65) Prior Publication Data

US 2008/0044665 A1 Feb. 21, 2008

Related U.S. Application Data

(63) Continuation of application No. 11/374,525, filed on Mar. 13, 2006, which is a continuation of application No. 08/660,755, filed on Jun. 10, 1996, now abandoned, and a continuation of application No. 08/660,756, filed on Jun. 10, 1996, now abandoned.

(30) Foreign Application Priority Data

| Jun. 9, 1995 | (GB) | ................................. 9511691.9 |
| Jul. 12, 1995 | (GB) | ................................. 9514190.9 |

(51) Int. Cl.
*B32B 9/00* (2006.01)

(52) U.S. Cl. ..................... 428/432; 359/350; 359/389; 428/336; 428/428; 428/697; 428/699; 428/701; 428/702

(58) Field of Classification Search ................ 359/580, 359/589; 428/336, 697, 699, 701, 702, 432, 428/428

See application file for complete search history.

(56) References Cited

U.S. PATENT DOCUMENTS

| 2,564,707 A | 8/1951 | Mochel |
| 3,149,989 A | 9/1964 | Johnson |
| 3,531,313 A | 9/1970 | Dates |
| 3,949,146 A | 4/1976 | Kane et al. |
| 3,984,591 A | 10/1976 | Plumat et al. |
| 4,066,815 A | 1/1978 | Olink et al. |
| 4,206,252 A * | 6/1980 | Gordon ..................... 427/160 |
| 4,286,009 A | 8/1981 | Griest |
| 4,294,868 A | 10/1981 | Kalbskopf et al. |
| 4,487,197 A | 12/1984 | Hoyois |
| 4,568,578 A | 2/1986 | Arfsten et al. |
| 4,687,687 A | 8/1987 | Terneu et al. |
| 4,859,496 A | 8/1989 | Toyonaga et al. |
| 4,873,352 A | 10/1989 | Kobashi et al. |
| 4,900,634 A | 2/1990 | Terneu et al. |
| 4,959,090 A | 9/1990 | Reinherz |
| 4,968,563 A | 11/1990 | Thomas et al. |
| 4,983,261 A | 1/1991 | Schuler et al. |
| 5,089,039 A | 2/1992 | Terneu et al. |
| 5,203,903 A | 4/1993 | Terneu et al. |
| 5,304,394 A | 4/1994 | Sauvinet et al. |
| 5,382,383 A | 1/1995 | Hirai et al. |
| 5,522,911 A | 6/1996 | Terneu et al. |
| 5,573,839 A | 11/1996 | Beaufays et al. |
| 5,657,149 A | 8/1997 | Buffat et al. |
| 5,780,149 A | 7/1998 | McCurdy et al. |
| 5,900,275 A | 5/1999 | Cronin et al. |
| 5,965,246 A | 10/1999 | Guiselin et al. |
| 6,042,934 A | 3/2000 | Guiselin et al. |
| 6,124,026 A | 9/2000 | McCurdy et al. |
| 6,218,018 B1 | 4/2001 | McKown et al. |
| 6,231,971 B1 * | 5/2001 | Terneu et al. ............... 428/336 |
| 6,423,414 B1 | 7/2002 | Legrand et al. |

FOREIGN PATENT DOCUMENTS

| CA | 2193158 | 6/1997 |
| CS | 220175 | 3/1983 |
| CS | 239788 | 1/1986 |
| DE | 3005797 | 8/1980 |
| EP | 0158318 | 10/1985 |
| EP | 0174727 | 3/1986 |
| EP | 0235968 | 9/1987 |
| EP | 0438357 | 7/1991 |
| EP | 0518755 | 12/1992 |
| EP | 0780346 | 6/1997 |
| FR | 946028 | 5/1949 |

OTHER PUBLICATIONS

Chamber's Technical Dictionary, Third Ed. Revised with Suppl, 1958, including preface, pp. 36-37 and pp. 494-495.
Bray, Dictionary of Glass, Materials and Techniques, A&C Black, 1995, p. 152-153.

*Primary Examiner*—Archene Turner
(74) *Attorney, Agent, or Firm*—Oblon, Spivak, McClelland, Maier & Neustadt, L.L.P.

(57) ABSTRACT

A glazing panel having beneficial anti-solar properties comprises a vitreous substrate carrying a tin/antimony oxide coating layer containing tin and antimony in a Sb/Sn molar ratio of from 0.01 to 0.14. In one application the coated substrate has a solar factor FS of less than 70% and the panel is formed by chemical vapor deposition from a reactant mixture comprising a source of tin and a source of antimony. In another application it is particularly suitable for use in vehicle glazing, in particular in vehicle roof windows, and the coated substrate has a spray-formed pyrolytic tin/antimony oxide coating having a thickness of at least 400 nm and, whereby the coated substrate has a luminous transmittance (TL) of less than 35% and a selectivity (TL/TE) of at least 1.3.

29 Claims, No Drawings

FOREIGN PATENT DOCUMENTS

| | | |
|---|---|---|
| FR | 2348166 | 7/1982 |
| GB | 866332 | 4/1961 |
| GB | 1455148 | 11/1976 |
| GB | 1517341 | 7/1978 |
| GB | 2044137 | 10/1980 |
| GB | 2078213 | 1/1982 |
| GB | 2200139 | 7/1988 |
| GB | 2234264 | 1/1991 |
| GB | 2247691 | 3/1992 |
| GB | 2248243 | 4/1992 |
| GB | 2274115 | 7/1994 |
| JP | 60141648 | 7/1985 |
| JP | 03103341 | 4/1991 |
| JP | 05294673 | 11/1993 |
| JP | 08073242 | 3/1996 |
| JP | 08019042 | 4/1996 |
| SE | 7609860-7 | 3/1978 |

* cited by examiner

GLAZING PANEL HAVING SOLAR SCREENING PROPERTIES

CROSS-REFERENCE TO RELATED APPLICATION

This Application is a continuation of U.S. application Ser. No. 11/374,525 filed Mar. 13, 2006, which is a Composite Continuation of U.S. application Ser. No. 08/660,755 filed Jun. 10, 1996 and U.S. application Ser. No. 08/660,756 filed Jun. 10, 1996. This Application claims the priority of United Kingdom Patent Application No. 95 11 691.9 filed Jun. 9, 1995 and United Kingdom Patent Application No. 95 14 190.9 filed Jul. 12, 1995, and titled "A glazing panel having solar screening properties and a process for making such a panel," the subject matter of each of which is incorporated herein by reference.

BACKGROUND OF THE INVENTION

1. Field of the Invention

The present invention relates to a glazing panel having solar screening properties. The panel according to one aspect of the invention takes the form of a substrate carrying a spray-formed pyrolytic coating containing tin and antimony. According to another aspect of the invention the invention takes the form of a substrate carrying a coating containing tin and antimony formed by chemical vapor deposition.

Reflective transparent solar control glazing panels have become a useful material for architects to use for the exterior facade of buildings. Such panels have aesthetic qualities in reflecting the immediate environment and, being available in a number of colors, in providing a design opportunity. Such panels also have technical advantages by providing the occupants of a building with protection against solar radiation by reflection and/or absorption and eliminating the dazzling effects of intense sunshine, giving an effective screen against glare, enhancing visual comfort and reducing eye fatigue.

From a technical point of view, it is desired that the glazing panel shall not pass too great a proportion of total incident solar radiation in order that the interior of the building shall not become overheated in sunny weather. The transmission of total incident solar radiation may be expressed in terms of the "solar factor". As used herein, the term "solar factor" means the sum of the total energy directly transmitted and the energy which is absorbed and re-radiated on the side away from the energy source, as a proportion of the total radiant energy incident of the coated glass.

Reflective transparent solar control glazing has also become much used in vehicle windows, where the objective is to protect the vehicle occupants against solar radiation. It has been used in railway carriages as side windows and in road vehicles for side, rear and roof windows. It has further been proposed to form the whole roof area of a motor car. It serves to provide protection against solar radiation by reflection and/or absorption and by eliminating the dazzling effects of intense sunshine, thereby giving an effective screen against glare; enhancing visual comfort and reducing eye fatigue. In this case the main energy factor to be considered is the total energy directly transmitted (TE), since the energy which is internally absorbed and re-radiated (AE) is dissipated by the movement of the vehicle. The essential aim of the vehicle panel is thus to have a low TE factor.

The properties of the coated substrate discussed herein are based on the standard definitions of the International Commission on illumination—Commission Internationale de l'Eclairage ("CIE").

The standard-illuminants quoted herein are CIE Illuminant C and Illuminant A. Illuminant C (mostly used for evaluating the optical properties of glazing panels for buildings) represents average daylight having a color temperature of 6700° K. Illuminant A (which equates to the light emitted by car headlamps and is therefore generally used to evaluate the optical properties of glazing panels for motor vehicles) represents the radiation of a Planck radiator at a temperature of about 2856° K.

The "luminous transmittance" (TL) is the luminous flux transmitted through a substrate as a percentage of the incident luminous flux.

The "luminous reflectance" (RL) is the luminous flux reflected from a substrate as a percentage of the incident luminous flux.

The "energy transmission" (TE) is the total radiant energy directly transmitted through a substrate as a percentage of the incident radiant energy.

The "energy reflection" (RE) is the radiant energy reflected from a substrate as a percentage of the incident radiant energy.

The "solar factor" (FS) is the ratio of the sum of the total energy directly transmitted through a substrate (TE) and the energy which is absorbed and re-radiated on the side away from the energy source (AE) as a proportion of the total radiant energy incident on the substrate.

The "selectivity" of the coated substrate relates to the balance between luminous transmission and energy transmission. In the case of building glass it is often defined as the ratio of the luminous transmittance to the solar factor (TL/ES), but for vehicle glass it commonly refers to the ratio of the luminous transmittance to the energy transmission (TL/TE).

The "dominant wavelength" (ID) is the peak wavelength in the range transmitted or reflected by the coated substrate.

The "purity" (p) of the color of the substrate refers to the excitation purity measured with Illuminant C. It is specified according to a linear scale on which a defined white light source has a purity of zero and the pure color has a purity of 100%. The purity of the coated substrate is measured from the side opposite the coated side.

The "emissivity" (e) is the ratio of the energy emitted by a given surface at a given temperature to that of a perfect emitter (black body with emissivity of 1.0) at the same temperature.

The term "refractive index" (n) is defined in the CIE International Lighting Vocabulary, 1987, page 138.

2. Description of the Related Art

A number of techniques are known for forming coatings on a vitreous substrate, including pyrolysis. Pyrolysis generally has the advantage of producing a hard coating, which precludes the need for a protective layer. The coatings formed by pyrolysis have durable abrasive- and corrosion-resistant properties. It is believed that this is due in particular to the fact the process involves depositing of coating material onto a substrate which is hot. Pyrolysis is also generally cheaper than alternative coating processes such as sputtering, particularly in terms of the investment in plant. The deposit of coatings by other processes, for example by sputtering, led to products with very different properties, in particular a lower resistance to abrasion and occasionally a different refractive index.

A wide variety of coating materials have been proposed for glazing panels, and for several different desired properties of the glazing. Tin oxide, $SnO_2$, has been widely used, often in combination with other materials such as other metal oxides.

GB Patent 1455148 teaches a method for pyrolytically forming a coating of one or more oxides on a substrate, primarily by spraying compounds of a metal or silicon, so as to modify the light transmission and/or light reflection of the substrate, or to impart antistatic or electrically conductive properties. Its examples of specified oxides include $ZrO_2$, $SnO_2$, $Sb_2O_3$, $TiO_2$, $CO_3O_4$, $Cr_2O_3$, $SiO_2$ and mixtures thereof. Tin oxide ($SnO_2$) is seen as advantageous because of its hardness and its ability to have antistatic or electrically conductive properties. GB Patent 2078213 relates to a sequential spray method for pyrolytically forming a coating on a vitreous support and is particularly concerned with tin oxide or indium oxide as the main coating constituents. When its metal coating precursor is tin chloride this is advantageously doped with a precursor selected from ammonium bifluoride and antimony chloride in order to increase the electrical conductivity of the coating.

It is also known that where a coating of tin oxide is formed by pyrolysis of $SnCl_4$, the presence of a dopant such as antimony chloride $SbCl_5$, directly mixed with the tin chloride $SnCl_4$, improves the absorption and reflection of some near solar infrared radiation.

Our earlier Patent, GB 2200139, describes and claims a method of forming a pyrolytic tin oxide coating on a hot glass substrate by spraying a solution containing a tin compound and additives which produce in the coating both fluorine and such materials as antimony, arsenic, vanadium, cobalt, zinc, cadmium, tungsten, tellurium and manganese so as to give the coating a low emissivity and a low specific internal haze factor. While the resultant coating has many desirable properties it falls short of the combination of properties now being sought.

SUMMARY OF THE INVENTION

It is an object of the present invention to provide a pyrolytically formed glazing panel having solar screening properties.

We have discovered that this and other useful objectives can be achieved by utilising chemical vapor deposition (CVD) to apply a pyrolytic coating comprising tin and antimony oxides in a specific relative ratio.

Thus, according to a first aspect of the present invention, there is provided a glazing panel comprising a vitreous substrate carrying a tin/antimony oxide coating layer containing tin and antimony in a Sb/Sn molar ratio of from 0.01 to 0.14, the said coating layer having been pyrolytically formed by chemical vapor deposition, whereby the so-coated substrate has a solar factor FS of less than 70%.

It is a further object of the present invention to provide a glazing panel having a high level of solar screening properties in combination with other desirable properties of luminous transmission and high selectivity.

We have discovered that this and other useful objectives can be achieved by a vitreous substrate bearing a thick pyrolytically sprayed coating comprising tin and antimony oxides in a specific relative ratio.

Thus, according to a second aspect of the present invention; there is provided a glazing panel comprising a vitreous substrate carrying a spray-formed pyrolytic tin/antimony oxide coating layer having a thickness of at least 400 nm and containing tin and antimony in a Sb/Sn molar ratio of from 0.05 to 0.14, whereby the coated substrate has a luminous transmittance (TL) of less than 35% and a selectivity (TL/TE) of at least 1.3.

DESCRIPTION OF THE PREFERRED EMBODIMENTS

Preferred embodiments relating the first aspect of the invention will initially be described.

The substrate is preferably in the form of a ribbon of vitreous material, such as glass or some other transparent rigid material. In view of the proportion of incident solar radiation which is absorbed by the glazing panel, especially in environments where the panel is exposed to strong or long-term solar radiation, there is a heating effect on the glass panel which may require that the glass substrate be subsequently subjected to a toughening process. However, the durability of the coating enables the glazing panel to be mounted with the coated face outermost, thus reducing the heating effect.

Preferably, the substrate is clear glass, although this aspect of the invention also extends to the use of colored glass as the substrate.

The Sb/Sn molar ratio in the coating layer is preferably at least 0.03, most preferably at least 0.05. This assists in ensuring a high level of absorption. On the other hand the said ratio is preferably less than 0.21, with a view to achieving a high level of luminous transmittance (TL). Most preferably the ratio is less than 0.15, since above this level the coating layer displays an unduly high level of absorption, coupled with poor selectivity.

Coated substrates according to the invention offer the advantage of a luminous reflectance (RL) of less than 11%. This low level of reflection in a building glazing panel is much favoured by architects. It avoids the panels creating glare in the vicinity of the building.

It may be useful to prevent interaction between the glass of the substrate and the tin/antimony oxide coating layer. As an example, it has been found that in the pyrolytic formation of a tin oxide coating from tin chloride on a soda-lime glass substrate, sodium chloride tends to become incorporated into the coating as a result of reaction of the glass with the coating precursor material or its reaction products, and this leads to haze in the coating.

Thus, an intermediate haze-reducing coating layer is preferably positioned between the substrate and the tin/antimony oxide coating layer. The haze-reducing layer may be pyrolytically formed in an incompletely oxidized state by contacting the substrate in an undercoating chamber with undercoat precursor material in the presence of oxygen in insufficient quantity for full oxidation of the undercoat material on the substrate. The expression "incompletely oxidized material" is used herein to denote a true sub-oxide, that it to say an oxide of a lower valency state of a multivalent element (for example $VO_2$ or TiO), and also to denote an oxide material which contains oxygen gaps in its structure: an example of the latter material is $SiO_x$ where x is less than 2, which may have the general structure of $SiO_2$ but has a proportion of gaps which would be filled with oxygen in the dioxide.

We prefer the haze-reducing coating layer to comprise a silicon oxide having a geometric thickness such as about 100 nm. The presence of a silicon oxide undercoating on soda-lime glass has the particular benefit of inhibiting the migration of sodium ions from the glass whether by diffusion or otherwise into the tin/antimony oxide coating layer either during formation of that upper layer or during a subsequent high temperature treatment.

Alternatively, the undercoat may be constituted as an "antireflection" undercoating such as, for example, an oxidized aluminum/vanadium layer as described in GB Patent specification 2248243.

The glazing panels according to the invention have a solar factor of less than 70%, preferably less than 60% and in some instances preferably less than 50%. The preference for a solar factor of less than 60% arises when the panels according to the invention are positioned with the coated side facing the exterior, i.e. facing the energy source. Generally, this positioning leads to a improved solar factor-compared with the positioning of the panel with the coated side away from the energy source. The need for a solar factor of less than 50% arises for buildings in parts of the world with high levels of solar energy. For vehicle sunroofs an even lower solar factor may be desirable.

The use of colored glass is one way of providing a lower solar factor, and is commonly employed in both building glass and vehicle glass. In comparing the effectiveness of coating layers it is therefore necessary to take into account any differences between the types of glass on which the respective coatings are deposited. Thus one example of a coating according to the invention on clear glass gave a solar factor of 63%, whereas an equivalent coating on a green colored glass gave a solar factor of 44.5%.

It is also desired that the glazing panel shall also transmit a reasonable proportion of visible light in order to allow natural illumination of the interior of the building or vehicle and in order to allow its occupants to see out. Thus it is desirable to increase the selectivity of the coating, that is to increase the ratio of the transmittance to the solar factor. Indeed it is preferred that the selectivity be as high as possible.

In general it is preferred that the luminous transmittance (TL) of the panel according to the invention is between 40 and 65%. Nevertheless, a panel having a light transmittance below 40% may be used as a roofing panel, for example as a vehicle sunroof.

Preferably, the tin/antimony oxide coating has a thickness of from 100 to 500 nm. Thick layers of tin/antimony oxide, particularly layers having a low Sb/Sn molar ratio, can provide a glazing panel with the advantageous combination of a low solar factor (FS) and low emissivity. Another way of obtaining this combination is to deposit on the tin/antimony oxide layer of the invention a low-emissivity layer of doped tin oxide, for example tin oxide doped with fluorine. However this is disadvantageous in the sense that it makes necessary the deposition of a supplementary layer, which is time-consuming and expensive.

In principle, another way to provide a combination of low solar factor and low emissivity could be to form a tin/antimony oxide layer containing a doping agent such as fluorine. For example, GB Patent 2200139 teaches a method of forming a pyrolytic tin oxide coating by spraying a solution which in addition to the tin precursor contains compounds which will result in the coating containing fluorine and at least one of antimony, arsenic, vanadium, cobalt, zinc, cadmium, tungsten, tellurium and manganese.

Thus one could, for instance, form a coating from reactants containing tin, antimony and fluorine in the ratios Sb/Sn=0.028, F/Sn=0.04. However we have discovered that the presence of fluorine has the apparent disadvantage of hindering the incorporation of antimony in the coating rather than effectively reducing the emissivity. For example reactants containing antimony and tin in the ratio Sb/Sn=0.028 gave a coating with an Sb/Sn ratio of about 0.057, whilst the same reactants plus a fluorine-containing reactant in an amount such that F/Sn=0.04 gave a coating with an Sb/Sn ratio of about 0.038.

The invention accordingly presents the advantage of simultaneously providing a solar factor (FS) below 60%, an emissivity of less than 0.4 (preferably less than 0.3) and a luminous transmittance (TL) of more than 60%. Thus the coated product fulfil two important functions. In winter it maintains the heat in the building, because of its low emissivity. In summer it resists the passage of solar heat into the building and thus avoids overheating inside the building, thanks to its low solar factor. This is especially achieved for coatings having an Sb/Sn ratio between 0.01 and 0.12, especially 0.03 to 0.07, and a thickness between 100 and 500 nm, for example between 250 and 450 nm.

Preferably the tin/antimony oxide coating layer is an exposed coating layer and the glazed panel comprises only one such tin/antimony oxide coating layer.

However, it is possible to provide one or more further coating layers, whether by pyrolysis or by other coating methods, to achieve certain desired optical qualities. It should be noted however, that the tin/antimony oxide layer when applied by pyrolysis has sufficient mechanical durability and chemical resistance to suitably serve as the exposed layer.

The panels according to the invention may be installed in single or multi-glazed assemblies. While the coated surface of the panel may be the inside surface of the exterior glazing panel so that the coated surface is not exposed to the ambient weather conditions which might otherwise more rapidly reduce its life by soiling, physical damage and/or oxidation, coatings produced by pyrolysis generally have a greater mechanical resistance than coatings produced by other methods and they may therefore be exposed to the atmosphere. The panels according to the invention may usefully be employed in laminated glass structures, for example where the coated surface is the inside surface of the exterior laminate.

When it is desired to manufacture pyrolytically coated flat glass, it is best to do so when the glass is newly formed. To do so has economic benefits in that there is no need to reheat the glass for the pyrolytic reactions to take place, and it also has benefits as to the quality of the coating, since it is assured that the surface of the glass is in pristine condition. Preferably, therefore, said coating precursor material is brought into contact with an upper face of a hot glass substrate constituted by freshly-formed flat glass.

Thus, the glazing panels according to the invention may be manufactured as follows. Each pyrolytic coating step may be carried out at a temperature of at least 400° C., ideally from 550° C. to 750° C. The coatings can be formed on a sheet of glass which moves in a tunnel oven or on a glass ribbon during formation, whilst it is still hot. The coatings can be formed inside the lehr which follows the glass ribbon forming device or inside the float tank on the top face of the glass ribbon whilst the latter is floating on a bath of molten tin.

The coating layers are applied to the substrate by chemical vapor deposition (CVD). This is a particularly beneficial method because it provides for coatings of regular thickness and composition, such uniformity of the coating being particularly important where the product is to cover a large area. CVD offers many advantages over pyrolysis methods using sprayed liquids as the reactant materials. With such spray methods it is difficult both to control the vaporization process and to obtain a good uniformity of coating thickness. Moreover, the pyrolysis of sprayed liquids is essentially limited to the manufacture of oxide coatings, such as $SnO_2$ and $TiO_2$. It is also difficult to make multi-layer coatings using sprayed liquids because every coating deposition produces a significant cooling of the substrate. Furthermore, chemical vapor deposition is more economic in terms of raw materials, leading to lower wastage.

The product with a CVD coating is physically different from those with coatings obtained by spraying. Notably a spray coating retains traces of the sprayed droplets and of the path of the spray gun, which is not the case with CVD.

To form each coating, the substrate is brought into contact, in a coating chamber, with a gaseous medium comprising the reactant mixture in the gaseous phase. The coating chamber is fed with the reactant gas through one or more nozzles, the length of which is at least equal to the width to be coated.

Methods and devices for forming such a coating are described for example in French Patent No. 2 348 166 (BFG Glassgroup) or in French Patent application No. 2 648 453 A1 (Glayerbel). These methods and devices lead to the formation of particularly strong coatings with advantageous optical properties.

To form the coatings of tin/antimony oxide, two successive nozzles are used. The reactant mixture comprising the sources of tin and antimony are fed in at the first nozzle. Where this mixture comprises chlorides which are liquid at ambient temperature, it is vaporized in a current of anhydrous carrier gas at an elevated temperature. Vaporization is facilitated by the atomization of these reagents in the carrier gas. To produce the oxides, the chlorides are brought into the presence of water vapor conducted to the second nozzle. The water vapor is superheated and is also injected into a carrier gas.

Advantageously, nitrogen is used as the substantially inert carrier gas. Nitrogen is sufficiently inert for the purposes in view, and it is inexpensive when compared with the noble gases.

Undercoatings of silicon oxide $SiO_2$ or $SiO_x$ may be deposited from silane $SiH_4$ and oxygen in accordance with the descriptions in British Patent specifications GB 2234264 and GB 2247691.

If a glass substrate bearing an incompletely oxidized coating is exposed to an oxidizing atmosphere for a sufficiently long period of time, it may be expected that the coating will tend to become fully oxidized so that its desired properties are lost. Therefore, such undercoat is over-coated with the tin/antimony oxide coating layer while it is still in an incompletely oxidized state, and while the substrate is still hot, thereby to preserve such undercoat in an incompletely oxidized state. The time during which the freshly undercoated glass substrate may be exposed to an oxidizing atmosphere such as air and before the undercoat is over-coated, without damaging the properties of the undercoat, will depend on the temperature of the glass during such exposure and on the nature of the undercoat.

Advantageously, said undercoating chamber is surrounded by a reducing atmosphere. The adoption of this feature assists in preventing ambient oxygen from entering the undercoating chamber and accordingly allows better control of the oxidizing conditions within that undercoating chamber.

The oxygen required for the undercoating reactions may be supplied as pure oxygen, but this adds unnecessarily to costs, and it is accordingly preferred that air is supplied to the undercoating chamber in order to introduce oxygen thereto.

It will be noted that the Sb/Sn molar ratio which is desirable in the reactant mixture does not always correspond to that ratio which is desirable for the tin/antimony coating layer Preferably the source of tin is selected from $SnCl_4$, monobutyl trichloro tin ("MBTC") and mixtures thereof. The source of antimony may be selected from $SbCl_5$, $SbCl_3$, organo antimony compounds and mixtures thereof. Examples of suitable source materials are $Sb(OCH_2CH_3)_3$, $Cl_{1.7}Sb(OCH_2CH_3)_{1.3}$, $Cl_2SbOCHClCH_3$, $Cl_2SbOCH_2CHCH_3Cl$ and $Cl_2SbOCH_3C(CH_3)_2Cl$.

This aspect of the invention will now be described in more detail, with reference to the following non-limiting examples.

In the Examples the Sb/Sn molar ratio in the coating layers was determined by an X-ray analysis technique in which the number of X-ray counts of the respective elements was compared. While this technique is not as precise as if a calibration by chemical dosage were made, the similarity of antimony and tin means that they respond similarly to X-rays. The ratio of the measured number of observed counts of the respective elements thus provides a close approximation to their molar ratio.

Colored rather than clear glass was employed as indicated in some of the Examples. The properties of the respective types of colored glass are shown in Table 1.1 below. In all cases the properties were measured on glass samples having a thickness of 4 mm, this being the thickness of glass employed in all the examples except Examples 1.1 to 1.7 (for which the thicknesses are shown in Table 1.2). The initials in the headings to this and the other following tables (TL, TE etc.) have the meanings described above.

With regard to the calculation of the solar factor, it should be noted that for luminous transmittances (TL) below 60% the effect of low emissivity is not negligeable and should be taken into account: as the emissivity reduces so equally does the solar factor.

TABLE 1.1

| | Glass Type | | | | |
|---|---|---|---|---|---|
| | Green A | Green B | Grey | Medium Grey | Dark Grey |
| λD in transmission (nm) [Illuminant: C/A] | 505.4/508.5 | 504.9/508.4 | 470.1/493.9 | 493.2/502.7 | 478.9/502.7 |
| Purity (%) | 2.9/3.4 | 2.1/2.5 | 1.5/0.8 | 5.6/5.1 | 2.6/1.8 |
| TL (%) [Illuminant: C/A] | 72.66/71.12 | 78.44/77.20 | 55.65/55.56 | 36.80/35.76 | 22.41/22.30 |
| TE (%) (CIE) | 44.0 | 52.3 | 56.9 | 25.9 | 31.11 |
| FS (%) coated side (CIE) | 56.8 | 62.9 | 66.3 | 43.4 | 47.3 |
| TL/FS [Illuminant: C] | 1.28 | 1.25 | 0.84 | 0.85 | 0.47 |

EXAMPLE 1.1

Clear soda-lime float glass advancing at a speed of 7 meters per minute along a float chamber was undercoated at a coating station located at a position along the float chamber where the glass was at a temperature of about 700° C. The supply line was fed with nitrogen, silane was introduced thereto with a partial pressure of 0.25% and oxygen was introduced with a partial pressure of 0.5% (ratio 0.5). A coating of silicon oxide $SiO_2$ having a thickness of 100 nm was obtained.

The undercoated substrate, having a thickness of 6 mm was then immediately coated by CVD pyrolysis using a coating apparatus comprising two successive nozzles. A reagent comprising a mixture of $SnCl_4$ as a source of tin and $SbCl_5$ as a source of antimony was used. The Sb/Sn molar ratio in the mixture was about 0.2. The reactant mixture was vaporised in a current of anhydrous nitrogen gas at about 600° C., was fed in at the first nozzle. Vaporization was facilitated by the atomization of these reagents in the carrier gas. Superheated water vapor was conducted to the second nozzle. The water vapor was heated to about 600° C., and was also injected into a carrier gas, which was air heated to about 600° C. The flow rate of gas (carrier gas+reagent) in each nozzle was 1 m3/cm width of substrate per hour, at the operating temperature.

The coating process was continued until the geometrical thickness of the tin/antimony oxide coating superimposed on the undercoated substrate was 185 nm.

EXAMPLES 1.2 to 1.7

In Examples 1.2 to 1.7, the procedure of Example 1.1 was followed but with variations in such parameters as the reactant mixture, the presence or absence of an undercoat oxide, the ratio of Sb/Sn in the coating and in the reactant mixture and the thickness of the glass substrate. For instance, compared with Example 1.1, in Example 1.2 no undercoating was applied and the tin/antimony oxide coating layer had a thickness of 210 nm. The reactant mixtures were as follows:

Examples 1.2 and 1.3: the same as in Example 1.1 (but with a lower concentration of the reactant mixture in the carrier gas in Example 1.3);
Example 1.4: MBTC and $Cl_{1.7}Sb(OCH_2CH_3)_{1.3}$;
Example 1.5: MBTC and Cl2SbOCH2CHCH3Cl;
Example 1.6: MBTC and Cl2SbOCH2C(CH3)2Cl;
Example 1.7: MBTC and SbCl3.

The variations in operating parameters for Examples 1.1 to 1.7 and the results obtained are given in the accompanying Table 1.2.

The glazing panels according to Examples 1.3 to 1.7 had a pleasant blue color in transmission: the dominant wavelength in transmission in the visible wavelength lay within the range of 470 to 490 nm.

Example 1.6 provided a glazing panel with the combination of a low solar factor FS and low emissivity.

In a variant of Example 1.6 the SiO2 undercoating was replaced by an anti-reflection undercoating of silicon oxide SiOx according to the procedure of GB patent 2247691. In another variant the SiO2 undercoating was replaced by an oxidized aluminum/vanadium layer according to GB Patent 2248243. In these variants the glazing panel had no purple aspect in the reflection from the uncoated side.

EXAMPLE 1.8

Colored float glass "Green A" advancing at a speed of 7 meters per minute along a float chamber was undercoated at a coating station located at a position along the float chamber where the glass was at a temperature of about 700° C. The supply line was fed with nitrogen, silane was introduced thereto with a partial pressure of 0.2%, and oxygen was introduced with a partial pressure of 0.5% (ratio 0.55). A coating of silicon oxide SiOx, with x approximately equal to 1.8, was obtained with a refractive index of about 1.7. The thickness of the coating was 40 nm.

The undercoated substrate, having a thickness of 4 mm, was then coated by CVD pyrolysis. A reagent comprising a mixture of MBTC as a source of tin and Cl1.7Sb(OCH2CH3)1.3 as a source of antimony was used. The Sb/Sn molar ratio in the mixture was about 0.195 (mass ratio 0.2). The reactant mixture was vaporized in a current of anhydrous air at about 200° C., fed in at the nozzle. Vaporization was facilitated by the atomization of these reagents in the carrier gas. Superheated water vapor was then introduced, heated to about 200° C.

The coating process was continued until the geometrical thickness of the tin/antimony oxide coating superimposed on the undercoated substrate was 120 nm.

EXAMPLES 1.9 to 1.14

In Examples 1.9 to 1.14, the procedure of Example 1.8 was followed but with variations as shown in the accompanying Table 1.2 in such parameters as the thickness of the undercoat, the ratio of Sb/Sn in the coating and in the reaction mixture, the thickness of the tin/antimony oxide coating layer and the color of the glass. The results of examples 1.8 to 1.14 are set out in Table 1.3.

The glazing panels according to the Examples 1.9 to 1.14 had a pleasant blue color in transmission, the dominant wavelength in transmission in the visible wavelength lying within the range of 470 to 490 nm (Illuminant C).

In a variant of Example 1.9 in which the Green A glass was replaced by Medium Grey glass, the resultant luminous transmittance (TL) was 20%, the luminous reflectance (RL) was 10% and the energy transmission (TE) was 15%.

EXAMPLES 1.15 to 1.30

The procedure of Example 1.1 was followed for further Examples 1.15 to 1.30 with variations in the reactant mixture, the color and thickness of the glass substrate, the thickness of undercoat oxide, and the ratio of Sb/Sn in the reactant mixture and in the coating. For Examples 1.15 to 1.22 the reactant mixture was MBTC and Cl1.7Sb(OCH2CH3)1.3 without trifluoroacetic acid whereas for Examples 1.23 to 1.30 the reactant mixture was MBTC and $Cl_{1.7}Sb(OCH2CH3)_{1.3}$ with trifluoroacetic acid. The F/Sn ratio in the reactant mixture for these examples was 0.04.

The variations in operating parameters, and the results obtained, are set out in the accompanying Table 1.4 for Examples 1.15 to 1.22 and in the accompanying Table 1.5 for Examples 1.23 to 1.30. The silicon oxide SiOx used in Examples 1.15 to 1.30 had a value of x approximately equal to 1.8.

TABLE 1.2

| | Example | | | | | | |
|---|---|---|---|---|---|---|---|
| | 1.1 | 1.2 | 1.3 | 1.4 | 1.5 | 1.6 | 1.7 |
| Tin/antimony oxide thickness (nm) | 185 | 210 | 105 | 120 | 105 | 445 | 110 |
| Undercoat oxide | $SiO_2$ | absent | absent | $SiO_2$ | $SiO_2$ | $SiO_2$ | $SiO_2$ |
| Undercoat thickness (nm) | 100 | 0 | 0 | 70 | 70 | 70 | 70 |
| Sb/Sn ratio in coating | 0.48 | 0.48 | 0.46 | 0.19 | 0.15 | 0.06 | 0.18 |
| Sb/Sn ratio in reactants | 0.20 | 0.20 | 0.20 | 0.20 | 0.20 | 0.10 | 0.20 |
| Haze (%) | 0.07 | 2.09 | 4.36 to 7.01 | low | low | low | low |
| TL (%) | 45.7 | 44.3 | 65.5 | 51.0 | 61.6 | 47.5 | 55.0 |
| RL (%) (coated side) | 9.0 | 12.0 | 18.8 | 12.0 | 11.7 | 6.6 | 13.7 |
| FS (%) (coated side) (CIE) | 55.3 | 56.9 | 66.0 | 58.4 | 62.2 | 47.2 | 59.6 |
| TL/FS | 0.83 | 0.78 | 0.99 | 0.87 | 0.99 | 1.01 | 0.92 |
| $\lambda_D$ in transmission (nm) | 587.5 | −560 | 480.1 | 478.8 | 481.0 | 483.0 | 479.3 |
| Colour purity in transmission (%) | 3.4 | 3.9 | 4.9 | 11.5 | 8.7 | 8.0 | 10.3 |
| $\lambda_D$ in reflection from the coated side (nm) | 472.3 | 494.5 | 575.3 | 579.5 | 577.6 | 490.0 | 577.0 |
| Colour purity (%) in reflection from the coated side | 36.9 | 7.0 | 19.1 | 35.0 | 35.2 | 6.0 | 33.1 |
| Emissivity | >0.7 | >0.7 | >0.7 | 0.84 | 0.71 | 0.25 | 0.79 |
| Glass thickness (mm) | 6 | 6 | 6 | 5 | 5 | 5 | 5 |

TABLE 1.3

| | Example | | | | | | |
|---|---|---|---|---|---|---|---|
| | 1.8 | 1.9 | 1.10 | 1.11 | 1.12 | 1.13 | 1.14 |
| Tin/antimony oxide thickness (nm) | 120 | 120 | 320 | 470 | 470 | 320 | 470 |
| Undercoat oxide | $SiO_2$ | $SiO_2$ | $SiO_2$ | $SiO_2$ | $SiO_2$ | $SiO_2$ | $SiO_2$ |
| Undercoat thickness (nm) | 40 | 70 | 40 | 40 | 40 | 40 | 40 |
| Sb/Sn ratio in coating | 0.10 | 0.18 | 0.09 | 0.09 | 0.09 | 0.09 | 0.09 |
| Sb/Sn ratio in reactants | 0.07 | 0.20 | 0.07 | 0.07 | 0.07 | 0.07 | 0.07 |
| Haze (%) | 0.36 | 0.1 | 1.0 | 1.8 | 1.8 | 1.0 | 1.8 |
| TL (%) [Illuminant A/Illuminant C] | 53/55 | 39/20 | 31/32 | 31/32 | 9/9 | 40/41 | 36 [A] |
| RL (%) (coated side) [Illuminant A/C] | 9/10 | 11/11 | 7/7 | 7/7 | 7/7 | 8/7 | 7 [A] |
| RL (%) (uncoated side) [Illuminant C] | 8 | 8 | 6 | 6 | 5 | 7 | — |
| TE (%) (CIE) | 31 | 25 | 25 | 18 | 9 | 21 | 27 |
| FS (%) (coated side) (CIE) | 45 | 41 | 41 | 36 | 29 | 39 | 43 |
| TL/FS | 1.2/1.2 | 0.95/0.98 | 0.76/0.78 | 0.86/0.89 | 0.31/0.31 | 1.02/1.05 | 5.4 [A] |
| $\lambda_D$ in transmission (nm) | 505.5/498.6 | 497.2/487.0 | 494.8/481.9 | 497.2/487.2 | 494.2/480.0 | 501.0/491.6 | 493.4 [A] |
| Colour purity in transmission (%) | 4.4/4.2 | 6.2/8.9 | 4.9/8.1 | 7.6/10.8 | 7.0/11.8 | 7.2/8.6 | 5.4 [A] |
| $\lambda_D$ in reflection from the coated side (nm) | 487.9/478.1 | −572.5/566.9 | −511.8/512.2 | −576.9/559.8 | −555.4/550.1 | −512.5/513.6 | −576.0 [A] |
| Colour purity (%) in reflection from the coated side | 7.4/14.6 | 2.2/2.9 | 17.2/16.3 | 6.0/1.2 | 2.1/6.6 | 15.4/14.5 | 1.5 [A] |
| Emissivity | 0.71 | 0.85 | 0.44 | 0.35 | 0.35 | 0.44 | 0.35 |
| Colour of glass | Green A | Green A | Grey | Green B | Dark grey | Green A | Clear soda lime |

TABLE 1.4

| | Example | | | | | | | |
|---|---|---|---|---|---|---|---|---|
| | 1.15 | 1.16 | 1.17 | 1.18 | 1.19 | 1.20 | 1.21 | 1.22 |
| Tin/antimony oxide thickness (nm) | 320 | 320 | 320 | 320 | 390 | 390 | 390 | 390 |
| Undercoat oxide | $SiO_x$ | $SiO_x$ | $SiO_x$ | $SiO_x$ | $SiO_x$ | $SiO_x$ | $SiO_x$ | $SiO_x$ |
| Undercoat thickness (nm) | 60 (approx) | 60 (approx) | 60 (approx) | 60 (approx) | 80 (approx) | 80 (approx) | 80 (approx) | 80 (approx) |
| Sb/Sn ratio in coating | 0.053 | 0.053 | 0.053 | 0.053 | 0.058 | 0.058 | 0.058 | 0.058 |
| Sb/Sn ratio in reactants | 0.028 | 0.028 | 0.028 | 0.028 | 0.028 | 0.028 | 0.028 | 0.028 |
| Haze (%) | 0.65 | 0.65 | 0.65 | 0.65 | 1.2 | 1.2 | 1.2 | 1.2 |
| TL (%) [Illuminant C] | 68.8 | 55.7 | 60.1 | 28.2 | 61.0 | 49.2 | 25.0 | 53.1 |
| RL (%) (coated side) | 8.9 | 8.2 | 8.4 | 7.2 | 9.0 | 8.0 | 7.2 | 6.9 |
| RL (%) (uncoated side) | 8.9 | 7.3 | 7.8 | 5.0 | 7.8 | 6.5 | 4.8 | 8.2 |

TABLE 1.4-continued

| | Example | | | | | | | |
|---|---|---|---|---|---|---|---|---|
| | 1.15 | 1.16 | 1.17 | 1.18 | 1.19 | 1.20 | 1.21 | 1.22 |
| TE (%) (CIE) | 50.8 | 28.3 | 33.1 | 15.8 | 43.0 | 24.5 | 13.7 | 28.5 |
| FS (%) (coated side) (CIE) | 60.3 | 43.6 | 47.2 | 34.4 | 54.7 | 40.9 | 32.9 | 40.1 |
| TL/TE | 1.35 | 2.00 | 1.82 | 1.75 | 1.42 | 1.96 | 1.79 | 1.86 |
| TL/FS | 1.15 | 1.27 | 1.28 | 0.82 | 1.11 | 1.20 | 0.76 | 1.20 |
| $\lambda_D$ in transmission (nm) | 524.0 | 506.2 | 506.0 | 494.0 | 496.0 | 500.7 | 493.4 | 499.5 |
| Colour purity in transmission (%) | 0.5 | 3.1 | 2.3 | 5.8 | 2.2 | 4.7 | 7.5 | 4.1 |
| $\lambda_D$ in reflection from the coated side (nm) | 482.9 | 484.2 | 484.0 | 482.9 | −495.2 | −493.8 | −495.0 | −550.3 |
| Colour purity (%) in reflection from the coated side | 14.5 | 16.2 | 15.8 | 18.0 | 5.0 | 4.4 | 6.4 | 7.0 |
| Emissivity | 0.29 | 0.29 | 0.29 | 0.29 | 0.27 | 0.27 | 0.27 | 0.27 |
| Colour of glass | Clear | Green A | Green B | Med. grey | Clear | Green A | Med. grey | Green B |

TABLE 1.5

| | Example | | | | | | | |
|---|---|---|---|---|---|---|---|---|
| | 1.23 | 1.24 | 1.25 | 1.26 | 1.27 | 1.28 | 1.29 | 1.30 |
| Tin/antimony oxide thickness (nm) | 290 | 290 | 290 | 290 | 410 | 410 | 410 | 410 |
| Undercoat oxide | $SiO_x$ | $SiO_x$ | $SiO_x$ | $SiO_x$ | $SiO_x$ | $SiO_x$ | $SiO_x$ | $SiO_x$ |
| Undercoat thickness (nm) | 80 (approx) | 80 (approx) | 80 (approx) | 80 (approx) | 90 (approx) | 90 (approx) | 90 (approx) | 90 (approx) |
| Sb/Sn ratio in coating | 0.038 | 0.038 | 0.038 | 0.038 | 0.037 | 0.037 | 0.037 | 0.037 |
| Sb/Sn ratio in reactants | 0.028 | 0.028 | 0.028 | 0.028 | 0.028 | 0.028 | 0.028 | 0.028 |
| Haze (%) | 0.82 | 0.82 | 0.82 | 0.82 | 1.2 | 1.2 | 1.2 | 1.2 |
| TL (%) [Illuminant C] | 70.2 | 56.7 | 61.0 | 28.7 | 64.2 | 51.9 | 26.9 | 56.4 |
| RL (%) (coated side) | 10.0 | 9.0 | 9.2 | 8.0 | 8.8 | 8.1 | 7.2 | 8.3 |
| RL (%) (uncoated side) | 9.5 | 8.0 | 8.3 | 5.2 | 7.7 | 6.6 | 4.8 | 6.9 |
| TE (%) (CIE) | 54.3 | 29.5 | 34.7 | 16.6 | 47.2 | 26.1 | 14.6 | 30.6 |
| FS (%) (coated side) (CIE) | 63.0 | 44.5 | 48.3 | 34.9 | 57.7 | 42.0 | 33.6 | 45.4 |
| TL/TE | 1.30 | 1.90 | 1.74 | 1.71 | 1.36 | 2.00 | 1.73 | 1.81 |
| TL/FS | 1.11 | 1.27 | 1.27 | 0.83 | 1.10 | 1.24 | 0.76 | 1.24 |
| $\lambda_D$ in transmission (nm) | 581.3 | 538.8 | 549.4 | 498.5 | 568.6 | 535.9 | 502.7 | 543.7 |
| Colour purity in transmission (%) | 2.9 | 2.9 | 2.7 | 3.3 | 3.5 | 3.7 | 3.6 | 3.5 |
| $\lambda_D$ in reflection from the coated side (nm) | 510.3 | 508.5 | 508.9 | 507.2 | 549.3 | 505.1 | 491.8 | 507.0 |
| Colour purity (%) in reflection from the coated side | 8.1 | 10.1 | 9.6 | 11.3 | 3.3 | 1.1 | 1.2 | 1.0 |
| Emissivity | 0.28 | 0.28 | 0.28 | 0.28 | 0.23 | 0.23 | 0.23 | 0.23 |
| Colour of glass | Clear | Green A | Green B | Med. grey | Clear | Green A | Med. grey | Green B |

Preferred embodiments relating the second aspect of the invention will now be described.

The substrate is preferably in the form of a ribbon or sheet of vitreous material, such as glass or some other transparent rigid material. In view of the proportion of incident solar radiation which is absorbed by the glazing panel, especially in environments where the panel is exposed to strong or long-term solar radiation, there is a heating effect on the panel which may require that the substrate be subsequently subjected to a toughening process. However, the durability of the coating enables the panel to be mounted with the coated face outermost, thus reducing the heating effect.

Preferably the substrate is formed of colored glass. It is found that the combination of coloration within the material of the glass and a coating according to the invention facilitates the achievement of the required low luminous transmission and high selectivity. The generally preferred colors for glass used in vehicle roofs, side or rear windows are grey and green.

The tin/antimony oxide coating preferably has a thickness of from 400 to 800 mm, most preferably 450 to 700 nm. Such thicknesses permit the achievement of a low total transmitted energy factor (TE) while retaining a sufficient level of light transmission. Thick layers of tin/antimony oxide, particularly layers having a low Sb/Sn molar ratio, can not only provide a glazing panel with the required low luminous transmission and high selectivity but also with the advantageous combination of a low solar factor FS and low emissivity.

It may be useful to prevent interaction between the glass of the substrate and the tin/antimony oxide coating layer. As an example, it has been found that in the pyrolytic formation of a tin oxide coating from tin chloride on a soda-lime glass substrate, sodium chloride tends to become incorporated into the coating as a result of reaction of the glass with the coating precursor material or its reaction products, and this leads to haze in the coating. Thus, an intermediate haze-reducing coating layer may if desired be positioned between the substrate and the tin/antimony oxide coating layer. Such an intermediate layer is generally unnecessary for low luminous transmission panels since the haze is not noticeable to any significant extent. If used it may comprise a silicon oxide having a geometric thickness such as about 100 nm. The presence of a silicon oxide undercoating on soda-lime glass has the benefit of inhibiting the migration of sodium ions from the glass whether by diffusion or otherwise into the tin/antimony oxide coating layer either during formation of that upper layer or during a subsequent high temperature treatment.

Panels according to this aspect of the invention are particularly well suited to use as vehicle roof panels, for example to tilting or sliding sunroofs, or even to form substantially the whole of the vehicle roof area. They may also advantageously be used as vehicle rear or rear side windows.

Glazing with a luminous transmittance of less than 35% is advantageous as a vehicle roof panel, most particularly if the panel is to form most or all of the roof area. While such a low level of luminous transmission is required according to the invention, it is also desirable that the glazing panel shall transmit some visible light in order to give a contribution to the natural illumination of the interior of the vehicle.

A high level of selectivity of the coating in combination with a low level of luminous transmission allows a low solar energy transmission. The selectivity provided by this aspect of the invention is essentially at least 1.3 and preferably at least 1.5. It is a particular benefit of this aspect of the invention that in practice it permits the achievement of selectivity values close to 2.

The energy transmission (TE) is therefore preferably less than 15%, most preferably less than 10%. Such low energy transmission assists in reducing the load on a vehicle air conditioning system.

For a whole-roof panel it may be advantageous to employ a panel with a luminous transmittance as low as 10% and energy transmission of just 5%, giving a selectivity of 2. For an opening roof panel somewhat higher transmission is generally preferred, for example luminous transmittance of about 20% and energy transmission of about 12%, again giving a selectivity approaching 2.

The Sb/Sn molar ratio in the coating is preferably in the range 0.07 to 0.20, most preferably 0.08 to 0.15. The preferred ranges arise from the need to have sufficient antimony to be effective in giving the required low transmission properties while not being present in sufficient amounts to affect the optical quality.

Conveniently the coating comprises simply a single layer of tin/antimony oxide. However, it is possible to provide one or more further coating layers, whether applied by pyrolysis or by other coating methods, to achieve certain desired optical qualities. It should be noted however, that the tin/antimony oxide layer when applied by pyrolysis has sufficient mechanical durability and chemical resistance to suitably serve as the exposed layer. Alternatively the said layer can be applied to the surface of the substrate that is to face the interior of a vehicle.

The panels according to the invention have properties of low reflectivity of visible light which are particularly advantageous for vehicle glazing. Preferably the reflectivity of visible light (RL) is lower than 12%, and may typically be between 5 and 12%.

The panels according to the invention may be installed in single or multi-glazed assemblies. The coating layers are applied to the hot substrate by spraying reactants in a liquid state, for example by means of a spray nozzle. While liquid spraying lacks the precision of alternative pyrolytic method of chemical vapor deposition (CVD), it is a convenient and inexpensive method for deposition of a thick coating layer, as in the present case. Indeed CVD is generally not a convenient method for the formation of thick coatings.

Especially in the preferred instance of applying the coating to a colored substrate any variations, resulting from the use of a spray method, in thickness or uniformity of the coating are barely visible. Preferably the source of tin is $SnCl_2$ and the source of antimony is $SbCl_3$, both materials being added to water for the spraying operation. Dissolved organometallic material may also be used.

When it is desired to manufacture pyrolytically coated flat glass, it is best to do so when the glass is newly formed. To do so has economic benefits in that there is no need to reheat the glass for the pyrolytic reactions to take place, and it also has benefits as to the quality of the coating, since it is assured that the surface of the glass is in pristine condition. Preferably, therefore, said coating precursor material is brought into contact with an upper face of a hot glass substrate constituted by freshly-formed flat glass.

Thus, the glazing panels according to the invention may be manufactured as follows. The pyrolytic coating step may be carried out at a temperature of at least 400° C., ideally from 550° C. to 750° C.

To form each coating, the substrate is brought into contact, in a coating chamber, with a spray of droplets containing the antimony—and tin-containing reactants. The spray is applied by one or more spray nozzles arranged to follow a path which provides the coating across the width of the ribbon to be coated.

In a spray-pyrolysis method the Sb/Sn molar ratio in the finished coating is not directly proportional to the ratio in the reactant mixture, and indeed is usually substantially different therefrom. The level of incorporation of antimony into the coating is significantly affected by such parameters as the spray rate, the type of glass and the glass temperature. Attempts to compute the coating proportions from the starting proportions are therefore unreliable and it is usually necessary to undertake preliminary trials to determine the starting proportions to meet the required coating proportions in a specific instance.

Following deposition the coatings are preferably polished, using any desired conventional polishing means. The coated product may also if desired be subjected to tempering.

This aspect of the invention will now be described in more detail with reference to the following non-limiting examples.

In the Examples the Sb/Sn molar ratio in the coating layers was determined by an X-ray analysis technique in which the number of X-ray counts of the respective elements was compared. While this technique is not as precise as if a calibration by chemical dosage were made, the similarity of antimony and tin means that they respond similarly to X-rays. The ratio of the measured number of observed counts of the respective elements thus provides a close approximation to their molar ratio.

EXAMPLES 2.1 to 2.21

In all the examples a Sb/Sn mixture was applied in an aqueous mixture to a moving ribbon of hot glass substrate having a thickness of 4 mm. Several different types of glass were employed, as shown in Table 2A below. The initials in the headings to this and the other following tables (TL, TE etc.) have the meanings described above. The columns FS p1 and FS p2 in Table 2C refer to the solar factor at, respectively the side of the glass facing the light source (positions) and the side remote from the light source (position2). Unless otherwise indicated the properties shown in the tables were measured under illuminant C. Under the conditions described the difference in TL between using illuminant C and illuminant A (more generally used in the field of automobile vehicles) was minimal, being of the same order of magnitude as routine errors of measurement.

In each case the mixture was a coating precursor solution containing approximately 1000 g (in total) of $SnCl_2$ and $SbCl_3$ per liter of the mixture and in the proportions shown in Table 2B below. The solution was applied to the substrate by a reciprocating spray nozzle which followed a path across the width of the ribbon.

TABLE 2A

| | Glass Type | | | | | |
|---|---|---|---|---|---|---|
| | Clear | Green A | Green C | Grey | Med. Grey 1 | Med. Grey 2 |
| λD in transmission (nm) [Illuminant: C/A] | | 505.4/508.5 | 509.7/510.2 | 470.1/493.9 | 493.2/502.7 | 494.6/502.8 |
| Purity (%) | | 2.9/3.4 | 3.2/4.0 | 1.5/0.8 | 5.6/5.1 | 9.9/9.3 |
| TL (%) [Illuminant: C/A] | 89.0 | 72.66/71.12 | 67.36/65.69 | 55.65/55.56 | 36.8/35.8 | 37.07/35.13 |
| TE (%) (CIE) | 83.0 | 44.0 | 37.1 | 56.9 | 25.9 | 20.9 |
| TL/TE (CIE C) | 1.07 | 1.65 | 1.81 | 0.98 | 1.42 | 1.77 |
| FS p1 (CIE) (%) | 86.0 | 56.8 | 51.7 | 66.3 | 43.4 | 39.7 |
| TL/FS | 1.03 | 1.28 | 1.30 | 0.84 | 0.85 | 0.93 |

The sprayed tin and antimony components reacted to form a pyrolytic tin oxide coating on the glass. The parameters employed and the results obtained are shown in Tables 2B and 2C.

It will be noted that Examples 2.4 and 2.5 do not satisfy the requirements of the claims herein in respect of the required coating thickness and selectivity and in the case of Example 2.5 also in respect of the required luminous transmission. These examples are included for comparison to show how operating outside the scope of the claims produces inferior results.

TABLE 2B

| Example | Glass Type | Sb/Sn of reactahts | Sb/Sn of coating | Coating thickness (nm) | TL (%) | RL (%) |
|---|---|---|---|---|---|---|
| 2.1 | Clear | 0.20 | 0.11 | 535 | 23.0 | 10.0 |
| 2.2 | Clear | 0.20 | 0.12 | 470 | 27.0 | 10.0 |
| 2.3 | Clear | 0.30 | 0.14 | 670 | 13.0 | 10.0 |
| 2.4 | Clear | 0.30 | 0.16 | 306 | 27.0 | 11.0 |
| 2.5 | Clear | 0.30 | 0.19 | 119 | 56.0 | 10.0 |
| 2.6 | Green A | 0.30 | 0.17 | 670 | 10.4 | 9.9 |
| 2.7 | Green C | 0.30 | 0.14 | 670 | 9.6 | 9.9 |
| 2.8 | Med. Grey 2 | 0.30 | 0.14 | 520 | 6.4 | 10.5 |
| 2.9 | Med. Grey 2 | 0.30 | 0.14 | 520 | 6.5 | 10.5 |
| 2.10 | Green A | 0.20 | 0.11 | 530 | 15.7 | 10.3 |
| 2.11 | Green C | 0.20 | 0.11 | 530 | 17.3 | 10.3 |
| 2.12 | Med. Grey 1 | 0.20 | 0.11 | 530 | 9.5 | 10.2 |
| 2.13 | Med. Grey 2 | 0.20 | 0.11 | 530 | 9.6 | 10.2 |
| 2.14 | Grey | 0.175 | 0.11 | 640 | 15.0 | 10.0 |
| 2.15 | Grey | 0.175 | 0.11 | 530 | 19.0 | 10.0 |
| 2.16 | Green A | 0.175 | 0.11 | 640 | 19.0 | 10.0 |
| 2.17 | Green A | 0.175 | 0.11 | 530 | 25.0 | 10.0 |
| 2.18 | Green C | 0.175 | 0.11 | 640 | 17.8 | 10.0 |
| 2.19 | Green C | 0.175 | 0.11 | 530 | 23.0 | 10.0 |
| 2.20 | Med. Grey 1 | 0.175 | 0.11 | 640 | 10.0 | 10.0 |
| 2.21 | Med. Grey 2 | 0.175 | 0.11 | 530 | 12.6 | 10.0 |

TABLE 2C

| Example | TE (%) | RE (%) | FS p1 (%) | FS p2 (%) | Emissivity (n) | TL/TE | TL/FS |
|---|---|---|---|---|---|---|---|
| 2.1 | 17.0 | 11.0 | 35.0 | 31.0 | 0.35 | 1.35 | 0.66 |
| 2.2 | 21.0 | 11.0 | 38.0 | 39.0 | | 1.29 | 0.71 |
| 2.3 | 10.0 | 11.0 | 30.0 | 26.0 | | 1.30 | 0.43 |
| 2.4 | 25.0 | 13.0 | 41.0 | 42.0 | 0.53 | 1.08 | 0.66 |
| 2.5 | 51.0 | 13.0 | 60.0 | 61.0 | 0.76 | 1.14 | 0.97 |
| 2.6 | 5.8 | 10.9 | 26.8 | 22.9 | 0.35 | 1.80 | 0.39 |
| 2.7 | 5.1 | 10.9 | 26.3 | 22.3 | 0.35 | 1.90 | 0.36 |
| 2.8 | 4.2 | 10.9 | 25.6 | 22.0 | 0.40 | 1.52 | 0.25 |
| 2.9 | 3.5 | 10.9 | 25.1 | 21.5 | 0.40 | 1.86 | 0.26 |
| 2.10 | 10.0 | 11.1 | 29.9 | 25.8 | 0.35 | 1.87 | 0.62 |
| 2.11 | 8.7 | 11.1 | 28.9 | 24.8 | 0.35 | 1.99 | 0.60 |
| 2.12 | 5.5 | 11.0 | 26.6 | 22.3 | 0.35 | 1.73 | 0.36 |
| 2.13 | 4.8 | 11.0 | 26.0 | 21.7 | 0.35 | 2.00 | 0.37 |
| 2.14 | 10.0 | 11.0 | 30.0 | | | 1.50 | 0.50 |
| 2.15 | 14.0 | 11.0 | 33.0 | | | 1.36 | 0.58 |
| 2.16 | 9.8 | 11.0 | 29.8 | | | 1.94 | 0.64 |
| 2.17 | 13.0 | 11.0 | 32.0 | | | 1.92 | 0.78 |
| 2.18 | 8.6 | 11.0 | 28.9 | | | 2.07 | 0.62 |
| 2.19 | 11.0 | 11.0 | 31.0 | | | 2.09 | 0.74 |
| 2.20 | 5.4 | 11.0 | 26.5 | | | 1.85 | 0.38 |
| 2.21 | 7.7 | 11.0 | 27.7 | | | 1.77 | 0.45 |

As variations to Examples 2.14 and 2.20, coatings were obtained having a thickness of 730 nm and an Sb/Sn ratio of 0.10. In both cases the resulting properties were substantially the same as the original Examples 2.14 and 2.20.

The product coated substrate in all the examples had a blue tint in transmission, with a dominant wavelength (D) between 470 and 490 nm, and a haze value between 0.7 and 1.1.

What is claimed is

1. A solar control glazing panel, having a solar factor (FS) of less than 70% and an emissivity of less than 0.4, comprising a soda-lime float glass substrate carrying a coating which comprises a plurality of coating layers:
    a first coating layer formed pyrolytically by chemical vapor deposition or by spray on the substrate, comprising tin and antimony oxides and having a Sb/Sn molar ratio ranging from 0.03 to 0.15, and
    a second coating layer positioned over the first coating layer and comprising tin oxide doped with fluorine,
    wherein the coating excluding the second coating layer is such as to confer on a 4 mm thick sheet of clear soda-lime glass a solar energy transmission (TE) measured according to the CIE standard ranging from 27 to 54.3%.

2. The glazing panel according to claim 1, wherein the glass substrate is clear glass.

3. The glazing panel according to claim 1, wherein the coating excluding the second coating layer is such as to confer on a 4 mm thick sheet of clear soda-lime glass a solar factor (FS) according to the CIE standard (coated side) ranging from 43 to 63%.

4. The glazing panel according to claim 1, wherein the glazing panel has a luminous transmittance (TL) measured under CIE standard Illuminant C of from 40 to 65%.

5. The glazing panel according to claim 1, wherein the first coating layer has a thickness ranging from 100 to 500 nm.

6. The glazing panel according to claim 1, further including at least one intermediate coating layer on the soda-lime glass substrate, the at least one intermediate coating layer being positioned on a side of the glass substrate in between the side of the glass substrate and the first coating layer.

7. The glazing panel according to claim 6, wherein the at least one intermediate coating layer is selected from the group consisting of a haze reducing coating layer, an anti-reflection undercoat and a silicon oxide undercoat.

8. The glazing panel according to claim 1, wherein the glazing panel has a luminous transmittance (TL) measured under CIE standard Illuminant C of from 40 to 65%, and further includes at least one intermediate coating layer on the soda-lime glass substrate, the at least one intermediate coating layer being positioned on a side of the glass substrate in between the side of the glass substrate and the first coating layer, and the second coating layer being positioned over the first coating layer, wherein the combination of the at least one intermediate coating layer and the first coating layer comprising tin and antimony oxides is such as to confer on a 4 mm thick sheet of clear soda-lime glass a solar factor (FS) according to the CIE standard (coated side) ranging from 43 to 63%, and wherein the first coating layer has a thickness ranging from 100 to 500 nm.

9. The glazing panel according to claim 8, wherein the glass substrate is clear glass.

10. The glazing panel according to claim 8, wherein the at least one intermediate coating layer is selected from the group consisting of a haze reducing coating layer, an anti-reflection undercoat and a silicon oxide undercoat.

11. A solar control glazing panel, having a solar factor (FS) of less than 70% and an emissivity of less than 0.4, comprising:
    a soda-lime glass substrate;
    a first coating layer formed pyrolytically by chemical vapor deposition or by spray on the soda-lime glass substrate, comprising tin and antimony oxides and having a Sb/Sn molar ratio ranging from 0.03 to 0.15, and
    a second coating layer, on the soda-lime glass substrate, comprising tin oxide doped with fluorine;
    wherein the solar control glazing panel without the second coating layer has a solar energy transmission (TE) measured according to the CIE standard ranging from 15.8 to 54.3%.

12. The glazing panel according to claim 11, wherein the glazing panel without the second coating layer has a solar energy transmission (TE) measured according to the CIE standard ranging from 34.7 to 50.8%.

13. The glazing panel according to claim 11, wherein the glazing panel without the second coating layer has a solar factor (FS) ranging from 34.4 to 63.0%.

14. The glazing panel according to claim 11, wherein the glazing panel has a luminous transmittance (TL) measured under CIE standard Illuminant C of from 40 to 65%.

15. The glazing panel according to claim 11, wherein the first coating layer has a thickness ranging from 100 to 500 nm.

16. The glazing panel according to claim 11, further including at least one intermediate coating layer on the soda-lime glass substrate, the at least one intermediate coating layer being positioned on a side of the glass substrate in between the side of the glass substrate and the first coating layer.

17. The glazing panel according to claim 16, wherein the at least one intermediate coating layer is selected from the group consisting of a haze reducing coating layer, an anti-reflection undercoat, and a silicon oxide undercoat.

18. The glazing panel according to claim 11, wherein the glass substrate has a thickness of 4 mm.

19. The glazing panel according to claim 11, wherein the glass substrate is selected from the group consisting of clear glass substrates and coloured glass substrates.

20. The glazing panel according to claim 11, wherein the glazing panel has a luminous transmittance (TL) measured under CIE standard Illuminant C of from 65%, and further includes at least one intermediate coating layer on the soda-lime glass substrate,
    the at least one intermediate coating layer being positioned on a side of the glass substrate in between the side of the glass substrate and the first coating layer, and
    the second coating layer being positioned over the first coating layer,
    wherein the combination of the glass substrate, the at least one intermediate layer and the first coating layer comprising tin and antimony oxides has a solar factor (FS) according to the CIE standard (coated side) ranging from 34.4 to 63.0%, and wherein the first coating layer has a thickness ranging from 100 to 500 nm.

21. The glazing panel according to claim 20, wherein the at least one intermediate coating layer is selected from the group consisting of a haze reducing coating layer, an anti-reflection undercoat, and a silicon oxide undercoat.

22. The glazing panel according to claim 20, wherein the glass substrate has a thickness of 4 nm.

23. The glazing panel according to claim 20, wherein the glass substrate is selected from the group consisting of clear glass substrates and coloured glass substrates.

24. A solar control glazing panel for the exterior facade of a building, the glazing panel transmitting visible light in order to allow natural illumination of the interior of the building and in order to allow occupants of the building to see out, the glazing panel comprising:
    a first coating layer formed pyrolytically by chemical vapor deposition or by spray on a soda-lime float glass substrate,
    said first coating layer comprising tin and antimony oxides and having a Sb/Sn molar ratio ranging from 0.03 to 0.15;

a second coating layer on the soda-lime float glass substrate, said second coating layer comprising tin oxide doped with fluorine; and at least one intermediate coating layer on the soda-lime float glass substrate, said intermediate layer being positioned on a side of the glass substrate in between the side of the glass substrate and the first coating layer, and wherein the second coating layer is positioned over the first coating layer, the glazing panel having:

transmission of visible light characterized by a luminous transmittance (TL) measured under CIE standard Illuminant C of from 40 to 65%, and a combination of a low solar factor and low emissivity characterized by a solar factor (FS) of less than 70% and an emissivity of less than 0.4.

25. The glazing panel according to claim 24, wherein the at least one intermediate coating layer is selected from the group consisting of a haze reducing coating layer, an anti-reflection undercoat, and a silicon oxide undercoat.

26. The glazing panel according to claim 24, wherein the glass substrate is selected from the group consisting of glass substrates having a thickness of 4 mm, glass substrates having a thickness of 5 mm and glass substrates having a thickness of 6 mm.

27. The glazing panel according to claim 24, wherein the glass substrate is selected from the group consisting of clear glass substrates and coloured glass substrates.

28. The glazing panel according to claim 24, wherein the first coating layer has a thickness ranging from 100 to 500 μm.

29. The glazing panel according to claim 24, wherein the combination of the glass substrate, the at least one intermediate layer and the first coating layer comprising tin and antimony oxides has a solar energy transmission (TE) according to the CIE standard ranging from 15.8 to 54.3%.

* * * * *